(12) United States Patent
Gardiner et al.

(10) Patent No.: US 9,470,112 B2
(45) Date of Patent: Oct. 18, 2016

(54) SYSTEM AND METHOD FOR HEAT RECOVERY AND STEAM GENERATION IN COMBINED CYCLE SYSTEMS

(71) Applicant: General Electric Company, Schenectady, NY (US)

(72) Inventors: Barrett David Gardiner, Schenectady, NY (US); Tailai Hu, Greenville, SC (US)

(73) Assignee: General Electric Company, Schenectady, NY (US)

( * ) Notice: Subject to any disclaimer, the term of this patent is extended or adjusted under 35 U.S.C. 154(b) by 159 days.

(21) Appl. No.: 14/541,005

(22) Filed: Nov. 13, 2014

(65) Prior Publication Data

US 2016/0138428 A1    May 19, 2016

(51) Int. Cl.
| | | |
|---|---|---|
| F01K 17/06 | (2006.01) | |
| F01K 13/02 | (2006.01) | |
| F01K 23/06 | (2006.01) | |
| F01K 27/02 | (2006.01) | |
| F01K 7/26 | (2006.01) | |

(52) U.S. Cl.
CPC .............. *F01K 23/06* (2013.01); *F01K 7/26* (2013.01); *F01K 13/02* (2013.01); *F01K 17/06* (2013.01); *F01K 27/02* (2013.01)

(58) Field of Classification Search
CPC .............. F01K 7/00; F01K 7/16; F01K 7/18; F01K 7/22; F01K 13/00; F01K 13/02; F01K 17/06; F01K 21/00; F22B 37/60; F22B 27/00

USPC ................................................. 60/641.1–681
See application file for complete search history.

(56) References Cited

U.S. PATENT DOCUMENTS

| | | | | |
|---|---|---|---|---|
| 2,902,831 A * | 9/1959 | Ipsen | ......................... | F01K 3/22 122/406.4 |
| 3,009,325 A * | 11/1961 | Pirsh | ......................... | F01K 9/04 122/1 B |
| 3,194,217 A * | 7/1965 | Grabowski | ............... | F28G 9/00 122/379 |
| 3,271,961 A * | 9/1966 | Wiener | ...................... | F01K 3/22 122/406.5 |
| 3,304,716 A * | 2/1967 | Griffin | ....................... | F01K 3/22 122/406.5 |

(Continued)

*Primary Examiner* — Thomas Denion
*Assistant Examiner* — Laert Dounis
(74) *Attorney, Agent, or Firm* — Fletcher Yoder, P.C.

(57) ABSTRACT

A system includes a heat recovery steam generator (HRSG) including a first pressure economizer, a first pressure evaporator that may receive a first portion of a feed water from the first pressure economizer at a first pressure, a re-heat section that may receive the first portion of the feed water from the first pressure economizer as a first steam flow, and a flash system including a first flash vessel that may receive a second portion of the feed water from the first pressure economizer and to generate a first flash steam flow. The system may combine the first flash steam flow with the first steam flow of the feed water at a second pressure less than the first pressure.

20 Claims, 4 Drawing Sheets

(56) References Cited

U.S. PATENT DOCUMENTS

| | | | | |
|---|---|---|---|---|
| 3,362,164 A | * | 1/1968 | Rudd | F22B 35/14 122/406.5 |
| 3,432,402 A | * | 3/1969 | Kirkland | D21C 11/0007 159/47.1 |
| 4,164,848 A | * | 8/1979 | Gilli | F01K 3/14 122/35 |
| 4,345,438 A | * | 8/1982 | Labbe | B01D 19/0063 60/657 |
| 4,354,347 A | | 10/1982 | Tomlinson et al. | |
| 4,402,183 A | | 9/1983 | Dimitroff et al. | |
| 4,487,166 A | * | 12/1984 | Haller | F22B 35/14 122/406.4 |
| 4,665,706 A | * | 5/1987 | Russell | F22B 35/105 60/646 |
| 5,048,466 A | * | 9/1991 | Rudd | F22B 29/12 122/406.4 |
| 6,983,585 B2 | | 1/2006 | Hattori et al. | |
| 8,486,165 B2 | | 7/2013 | Arya et al. | |
| 8,539,750 B2 | | 9/2013 | Bellows et al. | |
| 8,813,471 B2 | * | 8/2014 | Gulen | F02C 6/18 60/39.182 |
| 8,820,078 B1 | * | 9/2014 | Duffy | F22B 1/00 60/646 |
| 2013/0000272 A1 | | 1/2013 | Gulen et al. | |

* cited by examiner

SYSTEM AND METHOD FOR HEAT RECOVERY AND STEAM GENERATION IN COMBINED CYCLE SYSTEMS

BACKGROUND

The subject matter disclosed herein relates to combined cycle power plants, and more specifically to systems and methods for heat recovery and steam generation.

Certain power plants include a combined cycle. The combined cycle may enable greater energy efficiencies, for example, by capturing energy that would have normally been lost through exhaust heat. Accordingly, a combined cycle may include systems that transform energy from exhaust heat into useful power. For example, combined cycle power generation systems may include a gasification system that is integrated with at least one power producing turbine system. For example, a gasifier may convert a mixture of fuel, air or oxygen, steam, and other additives into an output of a partially combusted gas, typically referred to as a "syngas". The fuel is supplied to the combustor of a gas turbine engine. The gas turbine engine, in turn, drives a generator for the production of electrical power or drives another type of load. Exhaust from the gas turbine engine may be supplied to a heat recovery steam generator ("HRSG") so as to generate steam for a steam turbine. The power generated by the steam turbine may also drive an electrical generator or another type of load. As such, the combined cycle power plants may be useful in converting fuel and exhaust heat into power. It would be beneficial to improve the operations of a variety of combined cycle power plants.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a heat recovery steam generator (HRSG) including a first pressure economizer, a first pressure evaporator that may receive a first portion of a feed water from the first pressure economizer at a first pressure, a re-heat section that may receive the first portion of the feed water from the first pressure economizer as a first steam flow, and a flash system including a first flash vessel that may receive a second portion of the feed water from the first pressure economizer and to generate a first flash steam flow. The system may supply the first flash steam flow with the first steam flow of the feed water at a second pressure less than the first pressure.

In a second embodiment, a system includes a heat recovery steam generator (HRSG) including a high-pressure economizer and a high-pressure evaporator. The high-pressure economizer may provide a first fluid flow to the high-pressure evaporator, a second fluid flow to a gasifier during a first operation mode, and a third fluid flow to a flash system during a second operation mode. The system also includes a sensor coupled to the high-pressure evaporator. The sensor is configured to determine a fluid level of the high-pressure evaporator. The system also includes a controller configured to control a ratio between the first fluid flow and the third fluid flow during the second operation mode based at least in part on the determined fluid level of the high-pressure evaporator. The first fluid flow may drive a high-pressure stage and an intermediate-pressure stage of a steam turbine, and at least a portion of the third fluid flow may combine with the first fluid flow to drive the intermediate-pressure stage of the steam turbine.

In a third embodiment, a method includes supplying a first-pressure section of a heat recovery steam generator (HRSG) with a feed water. The first-pressure section includes a first economizer fluidly coupled to a first evaporator, the first economizer may heat the feed water to form a heated feed water, and the first economizer may direct a first portion of the heated feed water to the first evaporator. The method also includes determining a fluid level of the heated feed water within the first evaporator and directing a second portion of the heated feed water to a flash system fluidly coupled to a steam turbine. The flash system includes a first flash vessel, and a ratio between the first portion and the second portion of the heated feed water is based at least in part on the determined fluid level within the first evaporator. The method also includes generating a first flash steam flow in the first flash vessel from the second portion of the heated second feed water and directing the first flash steam flow to the steam turbine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
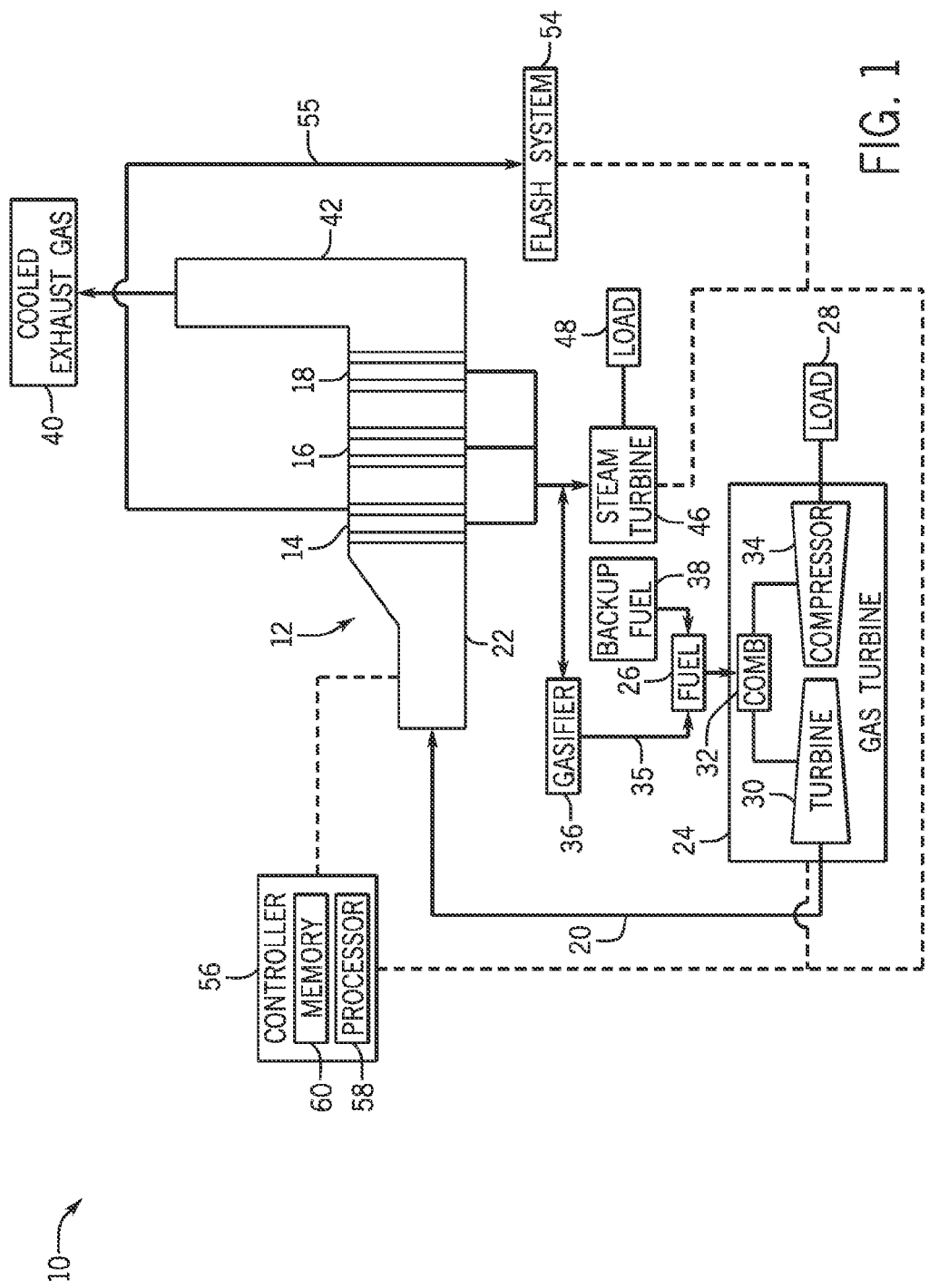
FIG. 1 is a schematic diagram of a combined cycle system having a heat recovery steam generator (HRSG) and a flash system, in accordance with an embodiment of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include a heat recovery steam generator (HRSG) that may be utilized with a combined cycle system such as, but not limited to, an integrated gasification combined cycle (IGCC) power plant. The HRSG includes various components that enable steam production using exhaust gas from a gas turbine engine. For example, the HRSG system may include one or more pressure sections (e.g., high-pressure (HP), intermediate-pressure (IP), and low-pressure (LP)) that each includes a steam drum, an evaporator, and an economizer The economizer may increase a temperature of feed water flowing into the evaporator to a temperature at or near a saturation temperature of the feed water, thereby decreasing an amount of heat that may be required for production of steam in the HRSG and increasing the efficiency of the combined cycle system and HRSG.

In some IGCC applications, the economizer in the high-pressure (HP) section of the HRSG system may be sized to receive a large amount of extracted feed water. For example, during gasification of a carbonaceous fuel (e.g., coal, biomass) in a gasifier of the IGCC system, the resultant syngas may be cooled in a radiant syngas cooler prior to use in the gas turbine. The gas turbine utilizes the syngas to drive a load and, in turn, generates the exhaust gas used to produce steam in the HRSG. Cooling of the syngas in the radiant syngas cooler may generate a large volume of steam that may form part of the feed water supplied to the HRSG for steam generation. In addition, during integrated operation (e.g., when syngas is being generated) of the IGCC system, the HRSG may produce a large volume of steam for use in other processes of the IGCC system. For example, the steam generated in the HRSG may be used for gasification of the carbonaceous fuel in the gasifier, heating of the syngas downstream of the radiant syngas cooler, and in a steam turbine used to drive a load associated with the IGCC system. However, because the HP economizer is sized to operate with the large volumes of water that may be utilized during the integrated processes of the IGCC, the HRSG system may be limited to two pressure levels (e.g., high pressure and low pressure). This is due, in part, because the total heat duty (the amount of heat available for energy transfer) in the HP economizer is such that there may not be sufficient energy to produce a desirable amount of intermediate-pressure steam. In other words, the HP economizer of the HRSG with only two pressure levels may be oversized relative to another HP economizer of an HRSG system with more than two pressure levels (e.g., high pressure, intermediate pressure, and low pressure).

While the oversized HP economizer facilitates production of large amounts of steam used in integrated operation of the IGCC system, the HP economizer may be too large during non-integrated operation (e.g., without gasification of the carbonaceous fuel) or partial load conditions of the IGCC. In non-integrated operation of the IGCC, the gas turbine may use back-up fuels such as natural gas and/or distillates to drive the load and enable steam production in the HRSG. However, when the IGCC system is operated without gasification of the carbonaceous fuel, the amount of feed water extraction from the HP economizer for steam production is significantly less compared to the amount of feed water extraction during the integrated operation. For example, because the steam from the HRSG is not used for gasification of the carbonaceous fuel or to heat the syngas, the amount of feed water used for steam generation is decreased. Therefore, the feed water through the oversized HP economizer during non-integrated operation of the IGCC system may absorb enough heat to be susceptible to steaming near the exit of the HP economizer As such, a flow of the feed water from the HP economizer may be bled to reduce undesirable steaming of the feed water. Accordingly, provided herein is a combined cycle system that utilizes a flash vessel system to extract feed water from the HP economizer and mitigate steaming of the feed water exiting the HP economizer With the foregoing in mind, FIG. 1 is a block diagram of an embodiment of a system 10 that includes an HRSG 12 that may form part of an IGCC system. The HRSG 12 may include one or more HRSG sections (e.g., evaporator sections), each including a natural or forced circulation evaporator. As shown in FIG. 1, the HRSG 12 includes a high-pressure (HP) evaporator section 14, an intermediate-pressure (IP) evaporator section 16, and a low-pressure (LP) evaporator section 18. However, in other embodiments, the IP section 14 may be omitted, as discussed above, additional pressure sections (e.g., 1 to 10 extra sections) may be added, or the HRSG 12 may be configured as a single-pressure system.

Generally, the HP evaporator section 14 generates HP steam, the IP evaporator section 16 generates IP steam, and the LP evaporator section 18 generates LP steam. Each section 14, 16, and 18 is a heat exchanger that generates steam by transferring heat from a heated exhaust gas 20 to water. As discussed in detail below, the sections 14, 16, and 18 may include additional components such as HP, IP, and LP drums and economizers to facilitate steam production in the HRSG 12. The HP evaporator section 14 is generally located near an inlet section 22 of the HRSG 12, which is fluidly coupled to a gas turbine 24 that supplies the exhaust gas 20 to the HRSG 12. For example, the gas turbine 24 combusts a fuel 26 to drive a first load 28 and generate the exhaust gas 20. The first load 28 may, for instance, be an electrical generator for producing electrical power. The gas turbine 24 may include a turbine 30, a combustor or combustion chamber 32, and a compressor 34. However, the specific configuration of the gas turbine 24 may be implementation-specific and may include any number and configurations of turbine stages, compressor stages, and combustors.

In certain embodiments, for example during integrated operation, the gas turbine 24 may utilize syngas 35 generated in a gasifier 36 of the IGCC system as the fuel 26. In other embodiments, the gas turbine 24 may use back-up fuels 38 such as, but not limited to, natural gas, distillates, or a combination thereof as the fuel 26 (e.g., during non-integrated operation). As should be noted, the gas turbine 24 may also use a mixture of the syngas 35 and back-up fuels 38 as the fuel 26. The type of fuel 26 used by the gas turbine 24 may be determined based on the power requirements for the load 28. In certain embodiments, because a composition and temperature of the exhaust gas 20 may vary based on the type of fuel 26 used by the gas turbine 24, the HRSG 12 may include duct burners that heat the exhaust gas 20 to a desired temperature for efficient production of the steam in the HRSG 12.

The temperature of the exhaust gas 20 from the gas turbine 24 may be highest near the HP evaporator section 14. As such, the HP evaporator section 14 generates HP steam. In other words, the high temperature of the exhaust gas 20 near the HP evaporator section 14 provides sufficient heat to produce the HP steam. The exhaust gas 20 enters the HRSG 12 through the inlet section 22. After the exhaust gas 20 passes through the HP evaporator section 14, the IP evaporator section 16, and the LP evaporator section 18, a cooled exhaust gas 40 exits the HRSG 12 from an HRSG stack 42. Thus, the cooled exhaust gas 40 may exit from the HRSG stack 42 into the atmosphere.

The system 10 may also include a steam turbine 46 for driving a second load 48. Similar to the first load 28, the second load 48 may also be an electrical generator for generating electrical power. However, both the first and second loads 28, 48 may be other types of loads capable of being driven by the gas turbine 24 and steam turbine 46. In addition, although the gas turbine 24 and steam turbine 46 may drive separate loads 28 and 48, as shown in the illustrated embodiment, the gas turbine 24 and steam turbine 46 may also be utilized in tandem to drive a single load via a single shaft.

In combined cycle systems such as system 10, hot exhaust (e.g., the exhaust gas 20) may flow from the gas turbine 24 and pass through the HRSG 12 to generate high-pressure, high-temperature steam, such as superheated steam. The steam produced by the HRSG 12 may then be passed through the steam turbine 46 for power generation. In addition, the produced steam may also be supplied to any other processes that use superheated steam. The gas turbine 24 generation cycle is often referred to as the "topping cycle," whereas the steam turbine 46 generation cycle is often referred to as the "bottoming cycle." By combining these two cycles as illustrated in FIG. 1, the system 10 may lead to greater efficiencies in both cycles. In particular, exhaust heat from the topping cycle may be captured and used to generate steam for use in the bottoming cycle.

Figure 2:
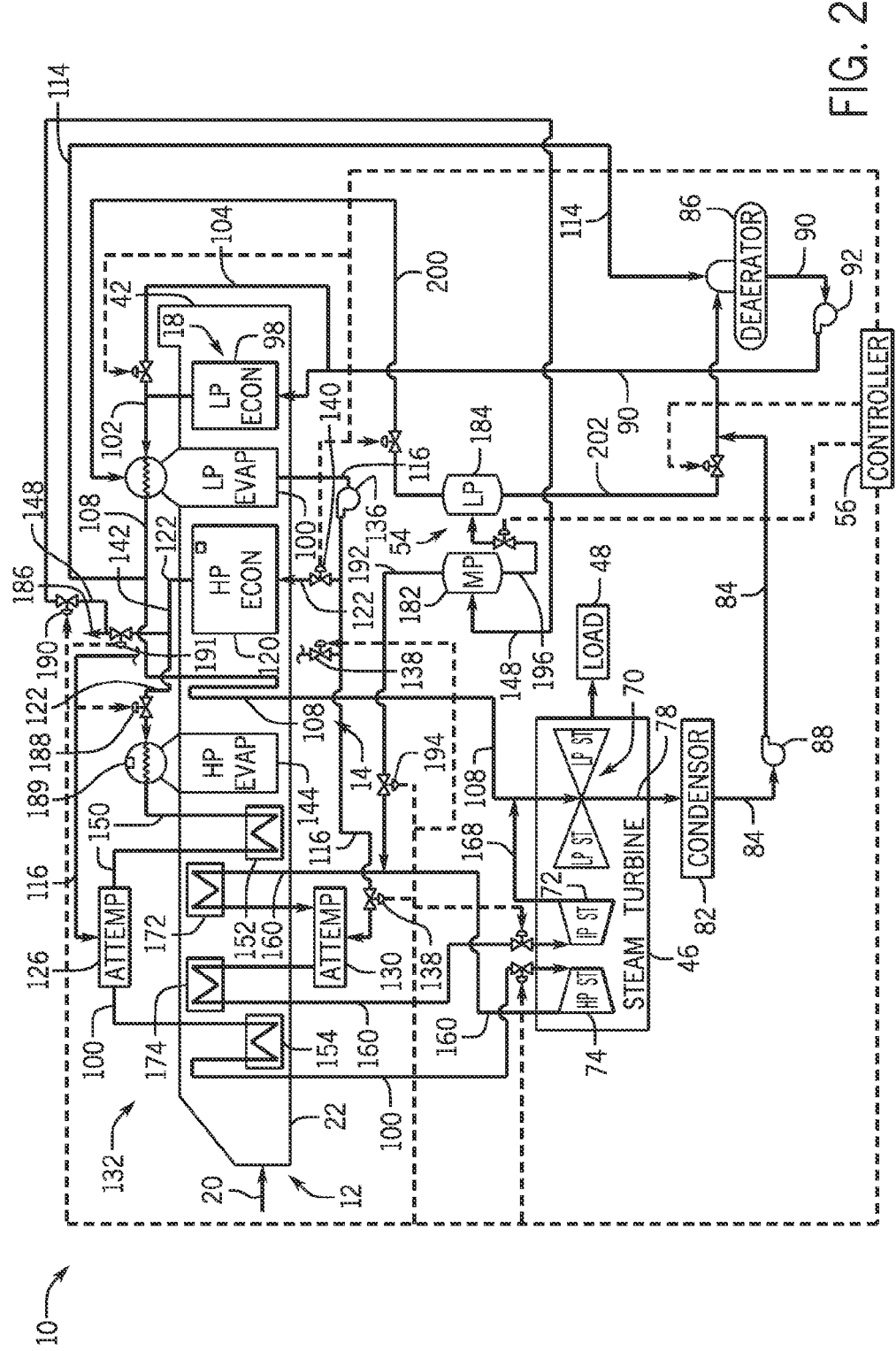
FIG. 2 is a schematic diagram of an embodiment of the combined cycle and flash system of FIG. 1, in which the flash system directs feed water to a deaerator.

As discussed above, HRSGs, such as the HRSG 12, coupled to an IGCC system may include an oversized HP economizer As such, during non-integrated processes or partial load operations of the IGCC system, excess feed water may be removed to reduce or eliminate feed water steaming at an exit of the HP economizer Therefore, in accordance with certain embodiments of the present disclosure, the HRSG 12 includes a flash system 54 to receive a feed water flow 55 that may be used to mitigate steaming of feed water exiting the HP economizer, as discussed in further detail below with reference to FIG. 2. The flash system 54 may generate additional steam that may be utilized in other sections of the HRSG 12 (e.g., a re-heat section, the LP section 18, etc.) for heat transfer within the HRSG 12 and/or for power generation via the steam turbine 46.

The system 10 may also include a controller 56 (e.g., an electronic and/or processor-based controller) to govern operation of the system 10. The controller 56 may independently control operation of the system 10 by electrically communicating with sensors (e.g., temperature and pressure sensors), control valves, and pumps, or other flow adjusting features throughout the system 10. For example, the controller 56 may control the flow adjusting features within the sections 14, 16, and 18, the inlet section 22, the gas turbine 24, the HRSG stack 42, the steam turbine 46, the flash system 54, or any combination thereof, based on information received from sensors associated with the flow adjusting features. The controller 56 may include a distributed control system (DCS) or any computer-based workstation that is fully or partially automated. For example, the controller 56 can be any device employing a general purpose or an application-specific processor 58, both of which may generally include memory circuitry 60 for storing instructions executable by the processor 58. Data stored on the memory circuitry 60 may include, but is not limited to, drum fluid levels, flow rates, pressure, and temperature parameters of the system 10. The processor 58 may include one or more processing devices, and the memory circuitry 60 may include one or more tangible, non-transitory, machine-readable media collectively storing instructions executable by the processor 58 to perform the acts of FIG. 4, as discussed below, and control actions described herein.

FIG. 2 is a schematic flow diagram of an embodiment of the system 10 which may utilize the flash system 54 and the methods of the disclosed embodiments. The components of the HRSG 12 in the illustrated embodiment are a simplified depiction of the HRSG 12 and are not intended to be limiting. Rather, the illustrated HRSG 12 is shown to convey the general operation of HRSGs that may be used in a combined cycle system. As discussed above, the exhaust gas 20 from the gas turbine 24 may be transported into the HRSG 12 and used to heat feed water and/or steam used to drive a load (e.g., the load 48) associated with the steam turbine 46. In the illustrated embodiment, the steam turbine 46 may include one or more low-pressure stages 70 (LP ST), one or more intermediate-pressure stages 72 (IP ST), and one or more high-pressure stages 74 (HP ST). In certain embodiments, the LP stage 70 may operate at pressures greater than approximately 50 psi (approximately 345 kPa), the IP stage 72 may operate at pressures greater than approximately 150 psi (approximately 1034 kPa), and the HP stage 74 may operate at pressures greater than approximately 250 psi (approximately 1724 kPa). However, the LP stage 70, the IP stage 72, and the HP stage 74 may operate at any other suitable pressure depending on the load 48. As should be appreciated, the specific configuration of the steam turbine 46 may be implementation-specific and may include any combination of stages. In operation, the steam turbine 46 generates an exhaust steam 78 from the LP stage 70 that may be directed into a condenser 82. Condensate 84 from the condenser 82 may, in turn, be directed into a deaerator 86 with the aid of a condensate pump 88. Following deaeration of the first condensate 84, the deaerator 86 may direct a first feed water 90 to the LP section 18 of the HRSG 12 via deaerated feed water pump 92.

The first feed water 90 may then flow through a low-pressure economizer 98 (LPECON). The exhaust gas 20 flowing through the HRSG 12 and the LPECON 98 heats the first feed water 90 via heat exchange, thereby forming a low-pressure feed water 102 that may be directed into a low-pressure evaporator 100 (LPEVAP). In certain embodiments, at least a portion of the first feed water 90 may bypass the LPECON 98 and flow directly to the LPEVAP 100, via flow path 104. The first feed water 90 may aid in temperature control of the steam generated in the LPECON 98 and/or adjust fluid levels in the LPECON 98. The LPEVAP 100 generates LP steam 108 that may be returned to either the LP stage 70 of the steam turbine 46, the deaerator 86, as illustrated by arrow 114, or a combination thereof In addition to generating the LP steam 108, the LPEVAP 100 also generates a low-pressure condensate 116. The LP condensate 116 may be used as a second feed water 122 that is directed to a high-pressure economizer 120 (HPECON). At least a portion of the LP condensate 116 may also be directed to a first inter-stage attemperator 126, a second inter-stage attemperator 130, or a combination thereof The LP condensate 116 flowing to the inter-stage attemperators 126, 130 facilitates control of a temperature of steam in a re-heat section 132 of the HRSG 12. For example, prior to flowing steam to the IP stage 72 and the HP stage 74 of the steam turbine 46, the LP condensate 116 may re-heat the steam to a desirable temperature. An LP condensate pump 136 may enable flow of the LP condensate 116 to the HPECON 120 and attemperators 126, 130. The controller 56 may control the pump 136 and/or control valves 138 to adjust a flow and/or flow rate of the LP condensate 116 and the second feed water 122 flowing to their respective components in the HRSG 12. For example, if the temperature of the steam in the re-heat section 132 is too high, the controller 56 may adjust one or both of the control valves 138 to increase a flow of the LP condensate 116 to the attemperator 126 or 130, thereby cooling the steam in the re-heat section 132. Similarly, the controller 56 may adjust a valve 140 to increase or decrease a flow of the second feed water 122 to the HPECON 120, and thereby maintain a fluid level within the HPECON 120 at a desired level to facilitate steam formation in the HRSG 12 to drive the load 48.

The HPECON 120 generally heats the second feed water 122 to a temperature near the saturation temperature of the second feed water 122, thereby forming a high-pressure feed water 142. The HPECON 120 directs the high-pressure feed water 142 to a high-pressure evaporator 144 (HPEVAP). In certain embodiments, at least a portion 148 of the high-pressure feed water 142 may bypass the HPEVAP 144 and flow to the flash system 54, as discussed in detail below. High-pressure steam 150 exiting the HPEVAP 144 may be directed into a primary high-pressure superheater 152 and a finishing high-pressure superheater 154 in the re-heat section 132. The superheaters 152, 154 superheat the HP steam 150 and eventually send it to the HP stage 74 of the steam turbine 46. The first inter-stage attemperator 126 may be located between the superheaters 152, 154. The first inter-stage attemperator 126 may allow for more robust control of the temperature of the HP steam 150 from the finishing HP superheater 154. Specifically, the first inter-stage attemperator 126 may be configured to control the temperature of the HP steam 150 exiting the finishing high-pressure superheater 154 by injecting cooler feed water spray (e.g., the LP condensate 116) into the superheated steam (e.g., the HP steam 150) upstream of the finishing high-pressure superheater 154 whenever the temperature of the HP steam 150 exiting the finishing high-pressure superheater 154 exceeds a predetermined value (e.g., a steam temperature of approximately 566° C. (1050° F., which is generally determined by a design of the steam turbine 46).

High-pressure exhaust steam 160 from the HP stage 74 of the steam turbine 46 may, in turn, be directed into the IP stage 72 of the steam turbine 46. In this way, the IP stage 72 may generate IP steam 168. The IP steam 168 may be combined with at least a portion of the LP steam 108 and directed to the LP stage 70 of the steam turbine 46. Before feeding to the IP stage 72, the HP exhaust steam 160 may flow through a primary re-heater 172 and a secondary re-heater 174, where it may be re-heated before being directed into the IP stage 72. The second inter-stage attemperator 130 controls the temperature of the HP exhaust steam 160, as discussed above. Similar to the HP steam 150 through the first inter-stage attemperator 126, the HP exhaust steam 160 may flow through the second inter-stage attemperator 130 that may control the temperature of the HP exhaust steam 160 exiting the secondary re-heater 174. For example, the second inter-stage attemperator 130 may inject cooler feed water spray (e.g., LP condensate 116) from the LPEVAP 100 into the HP exhaust steam 160 upstream of the secondary re-heater 174 whenever the exhaust temperature of the HP exhaust steam 160 exiting the secondary re-heater 174 exceeds a predetermined value (e.g., a steam temperature of approximately 566° C. (1050° F., which is generally determined by a design of the steam turbine 46).

As discussed above, in combined cycle systems, the HP economizer 120 may be sized to operate with the large volume of feed water extracted for steam production during the integrated operation of the system 10. However, in non-integrated operation, feed water exiting the HP economizer 120 may be susceptible to undesirable steaming. For example, a temperature of the exhaust 20 flowing through the HP section 14 is generally constant during integrated and non-integrated operation. Therefore, unless duct burners are used to increase a temperature of the exhaust gas 20, an amount of heat provided to the HP economizer 120 during integrated and non-integrated operation is essentially the same. As discussed above, the HP economizer 120 sized for integrated operation is generally larger than an HP economizer 120 sized for non-integrated operation of the system 10, because the volume of feed water used to generate steam is decreased compared to the integrated operation of the system 10. Accordingly, a flow rate and/or a flow quantity of the feed water (e.g., the high-pressure feed water 142) from the HPECON 120 to the HPEVAP 144 may be reduced during the non-integrated operation relative to integrated operation. Thus, the feed water in the HPECON 120 may be exposed to the temperature of the exhaust gas 20 for longer periods of time (i.e., increased residence time) relative to integrated operation. The longer heat exposure may result in undesirable steaming of the high-pressure feed water 142 exiting the HPECON 120. Therefore, the HPECON 120 may direct a portion of the high-pressure feed water (e.g., the feed water 148) to the flash system 54 at a point between the HPECON 120 and the HPEVAP 144 to minimize steaming of the high-pressure feed water 142. That is, once fluid levels in the HPEVAP 144 are at desirable levels for HP steam production, the high-pressure feed water 142 exiting the HPECON 140 may be directed to the flash system 54, thereby bypassing the HPEVAP 144. In this way, a temperature of the second feed water 122 within the HPECON 120 may be maintained such that steaming of high-pressure feed water 142 is reduced or eliminated.

In certain embodiments, the flash system 54 includes a medium-pressure flash vessel 182 (MP flash vessel) and a low-pressure flash vessel 184 (LP flash vessel) that are configured to receive the excess feed water 148. For example, in certain embodiments, the excess feed water 148 may bypass the HPEVAP 144 and flow to the MP flash vessel 182. While in the illustrated embodiment the excess feed water 148 is extracted from a flow path that is used for cooling the radiant syngas cooler and/or heating syngas (e.g., the syngas 35) generated during integrated operation, as illustrated by arrow 186, the excess feed water 148 may be extracted at any point between the HPECON 120 and the HPEVAP 144. For example, the excess feed water 148 may be extracted directly from the HPECON 120 or downstream of the HPECON 120 at a valve 188 between the HPECON 120 and the HPEVAP 144. In certain embodiments, the controller 56 may receive information from a fluid level sensor 189 in the HPEVAP 144 that indicates a level of the second feed water 122 in the HPEVAP 144. When the level of the second feed water 122 in the HPEVAP 144 has reached a threshold value, the controller 56 may close or adjust the valve 188 to redirect a flow of the excess feed water 148 to the MP flash vessel 182. The controller 56 may simultaneously provide instructions to open valves 190 and 191 to enable a flow of the excess feed water 148 to the radiant syngas cooler, syngas heater, and the flash system 54.

In other embodiments, the controller 56 may provide instructions to the valves 188, 190 to control a ratio of a flow of the high-pressure feed water 142 flowing into the HPE- VAP 144 and diverted to the flash system 54. For example, during non-integrated operation of the system 10, the sensor 189 may provide fluid level information to the controller 56. That is, the sensor 189 may determine a volume of the high-pressure feed water 142 within the HPEVAP 144. Based on the volume of the high-pressure feed water 142, the controller 56 may adjust the ratio of the high-pressure feed water 142 directed to the HPEVAP 144 and the flash system 54. For example, if the fluid level of the high-pressure feed water 142 in the HPEVAP 144 is within approximately 50% to approximately 90% of the threshold volume, the controller 54 may adjust the valves 188, 190 such that the flow of high-pressure feed water 142 flowing into the HPEVAP 144 is decreased and a flow of the excess feed water 148 to the flash system 54 is increased. Similarly, in other embodiments, if the fluid level within the HPEVAP 144 is less than 50% of a threshold volume, the controller 56 may adjust the control valves 188, 190 to increase a flow of the high-pressure feed water 142 to the HPEVAP 144 and decrease a flow of the excess feed water 148 to the flash system 54, respectively. During integrated operation of the system 10, the controller 54 may maintain the valve 190 closed and simultaneously adjust the valve 188 and a valve 191 to control a ratio of high-pressure feed water 142 flowing to the HPEVAP 144 and the gasifier 36 (or other components of the gasification system), as discussed above.

The excess feed water 148 may exit the HPECON 120 at a pressure between approximately 1500 pounds per square inch (psi) and approximately 4000 psi (approximately 10 megapascals (MPa) to approximately 28 MPa). The MP flash vessel 182 may operate at a pressure corresponding to a cold reheat (CRH) pressure (e.g., a pressure in the IP inter-stage attemperator 126). For example, the MP flash vessel 182 may operate at a pressure of between approximately 200 psi to approximately 400 psi (approximately 1379 kPa and approximately 2758 kPa). Accordingly, the pressure of the excess feed water 148 decreases in the MP flash vessel 182. The MP flash vessel 182 may flash the excess feed water 148 to generate a medium-pressure (MP) steam 192 used to supplement total steam to the IP section 72 of the steam turbine 46. In some embodiments, the MP steam 192 may be used to re-heat the HP exhaust steam 160 in the IP inter-stage attemperator 130 upstream of the IP stage 72 of the steam turbine 46. Depending on the desired temperature of the HP exhaust flowing to the IP stage 72, the controller 56 may adjust a valve 194 to control a flow rate of the MP steam 192 to the IP inter-stage attemperator 130.

Medium-pressure condensate 196 from the MP flash vessel 182 is directed to the LP flash vessel 184. The LP flash vessel 184 may operate at a pressure corresponding to a pressure of the LPEVAP 100. For example, the LP flash vessel 184 may operate at a pressure of between approximately 50 psi and approximately 150 psi (approximately 345 kPa and approximately 1034 kPa). The LP flash vessel 184 flashes the MP condensate 194 (e.g., at pressures between approximately 200 to 400 psi) to generate LP steam 200. The LP steam 200 may be directed to the LPEVAP 100, thus supplementing total LP steam 108 production. In certain embodiments, the LP steam 200 may be directed to the LP stage 70 of the steam turbine 46 or any other suitable process within the system 10 that may utilize the LP steam 200.

LP condensate 202 from the LP flash vessel 184 may be directed to the deaerator 86 to form part of the first feed water 90. By flowing the LP condensate 202 to the deaerator 86, a temperature of the first feed water 90 may be increased and an amount of low-pressure pegging steam (steam used to heat feed water) supplied to the deaerator 86 may be decreased. Therefore, in addition to reducing steaming of the excess feed water 148, extracting the excess feed water 148 upstream of the HPECON 120 and flowing to the MP flash vessel 182 and the LP flash vessel 184 may allow the HPECON 120 to serve as a medium/intermediate-pressure and LP steam generator. Accordingly, the efficiency of the system 10 may be increased during non-integrated and/or partial-load operation of the system 10. For example, the efficiency of the system 10 may be increased by utilizing at least a portion of the heat from the excess feed water 148 within the system 10. That is, at least a portion of the heat of the excess feed water 148 may be extracted to drive the load 48.

Figure 3:
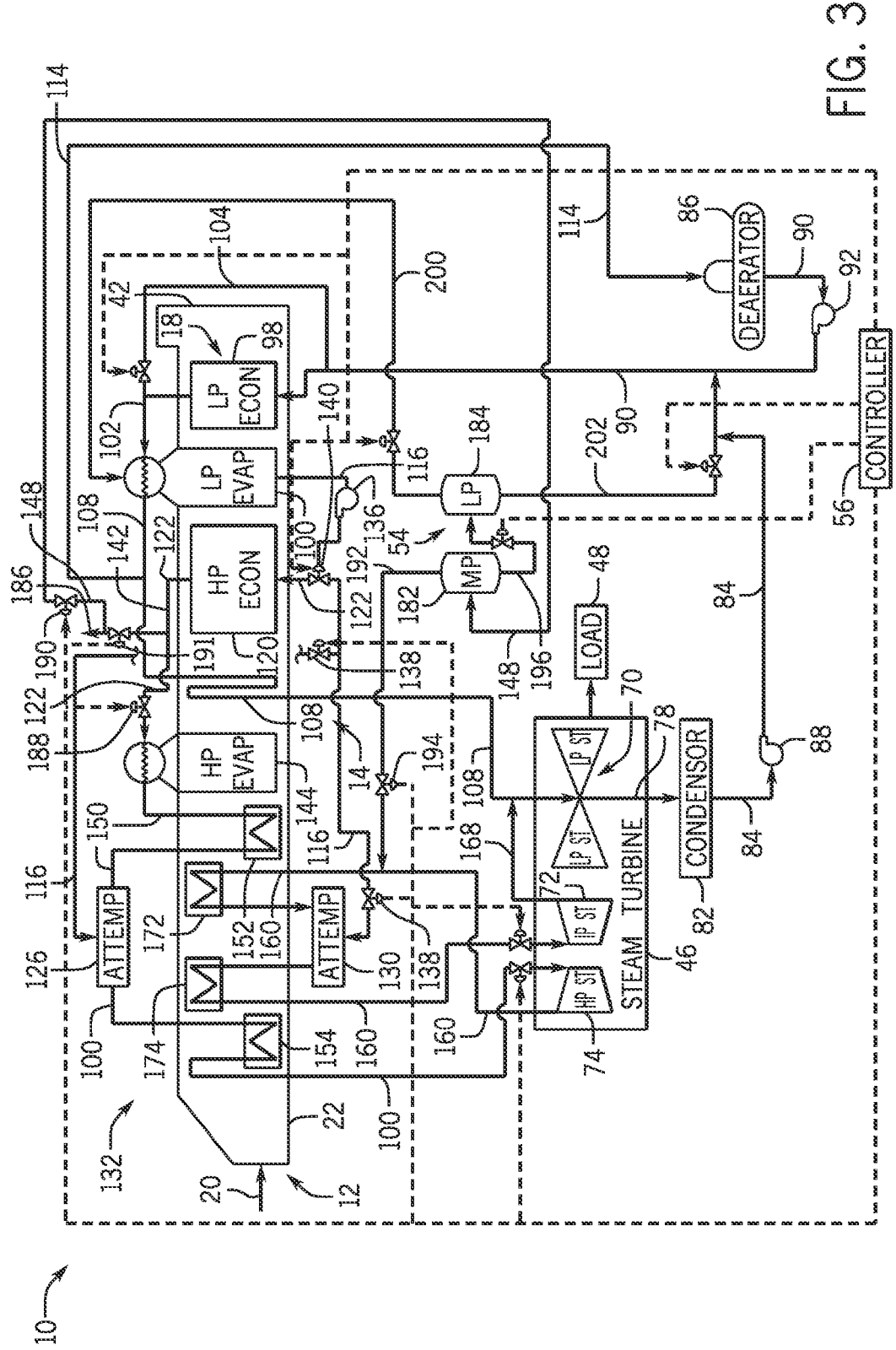
FIG. 3 is a schematic diagram of another embodiment of the combined cycle and flash system of FIG. 1, in which the flash system directs feed water to a low-pressure economizer in the HRSG.

In certain embodiments, the LP condensate 202 may be combined with the first feed water 90 at any point between the deaerator 86 and the LPECON 98, as illustrated in FIG. 3. That is, the LP condensate 202 may bypass the deaerator 86. Directing the LP condensate 202 to the LPECON 98 may increase stack gas temperature in the HRSG 12 and decrease condensation of components in the exhaust 20. For example, the exhaust gas 20 may include sulfur compounds that may condense in the LP section 18 and/or the HRSG stack 42 due to the decrease in temperature of the exhaust gas 20 in those sections of the HRSG 12. As such, fouling of HRSG surfaces at or near the LP section 18 and the HRSG stack 42 may occur. However, the LP condensate 202 may maintain a desired temperature in the LPECON 98 and decrease condensation conditions for the sulfur compounds in the LP section 18 and the HRSG stack 42.

As discussed above, the excess feed water 148 may be used to provide steam to the IP stage 72 of the steam turbine and transfer heat to feed water for the HRSG 12. In certain embodiments, between approximately 15% and approximately 30% of the excess feed water 148 may be used to form the MP steam 192, between approximately 5% and approximately 15% of the excess feed water 148 may be used to form the LP steam 200, and between approximately 65% and approximately 80% of the excess feed water 148 may be used to generate the LP condensate 202. Accordingly, the system 10 may utilize the excess feed water 148 to provide heat and/or steam to facilitate operation of the steam turbine 46. Therefore, the second feed water 122 within the HPECON 120 may be kept at a desired level such that steaming of the excess feed water 148 exiting the HPECON 120 may be mitigated. In addition, utilizing the excess feed water 148 in other processes of the system 10 during non-integrated operation may improve the overall efficiency of the HRSG 12.

Figure 4:
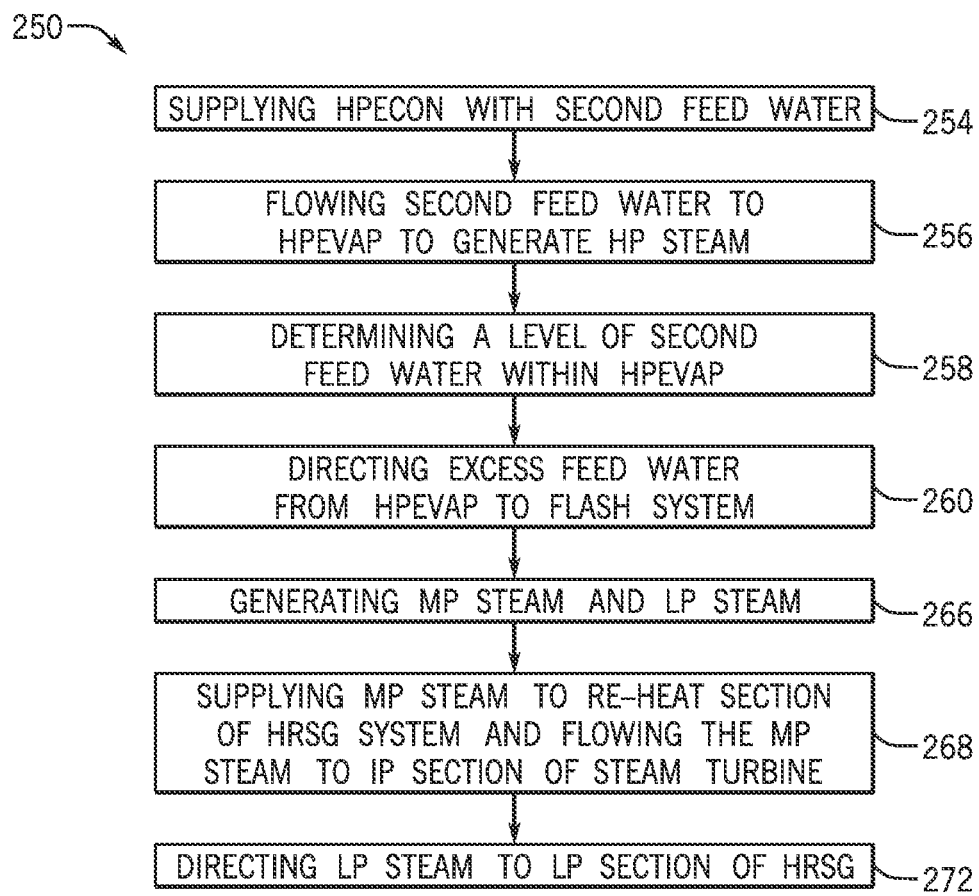
FIG. 4 is a flow diagram of an embodiment of a method that may be used to generate medium and low-pressure steam using the combined cycle and flash system of FIG. 1.

Present embodiments also include a method that utilizes the flash system 54 to extract the excess feed water 148 from the HRSG 12. As should be noted, the method described herein may be used during integrated and non-integrated operation of the combined cycle system, such as the system 10 of FIG. 1. In addition certain steps in the method may be stored in the memory 60 and are executable by the processor 58 of the controller 56. FIG. 4 illustrates a flow diagram of a method 250 by which a combined cycle system (e.g., the system 10 described above) may extract the excess feed water 148 exiting the HPECON 120 and utilize the excess feed water 148 to provide heat to other processes within the system 10. The method 250 includes supplying (block 254) the HPECON 120 with the second feed water 122, as described above with reference to FIG. 2. The method 250 also includes flowing (block 256) the second feed water 122 to the HPEVAP 144 to generate HP steam 150. The method 250 further includes determining (block 258) a level of the second feed water 122 in the HPEVAP 144. The method 250 also includes directing (block 260) the excess feed water 148 from the HPECON 120 to the flash system 54. As discussed above, during non-integrated or partial load operation of the system 10, the amount of the high-pressure feed water 142 supplied to the HPEVAP 144 may be decreased. As such, the second feed water 122 in the HPECON 120 may reach temperatures that result in undesirable steaming unless otherwise directed from the HPECON 120. Therefore, the excess feed water 148 may bypass the HPEVAP 144 and be directed to the flash system 54 to maintain a desired temperature of the second feed water 122 within the HPECON 120, thereby mitigating steaming of the high-pressure feed water 142. The method 250 also includes generating (block 266) the MP flash steam 192 and the LP flash steam 200 in the flash system 54 from the excess feed water 148. The MP flash steam 192 is directed to the re-heat section 132 of the HRSG 12 (block 268). In some embodiments, the MP flash steam 192 is used for heating the HP exhaust steam 160 used in the IP stage 72 of the steam turbine 46. In addition, the MP flash steam 192 may supplement IP steam 108 (e.g., as steam 160) to the IP section 72 of the steam turbine 46. The LP flash steam 200 is routed to the LPECON 98 (block 272), where the LP flash steam 200 may heat the first feed water 90 in the LPEVAP 100 to generate the LP steam 108. Moreover, similar to the MP flash steam 192, the LP flash steam 200 may supplement LP steam 108 production in the LPEVAP 100.

As described above, certain embodiments of the system 10 may include bypassing the excess feed water 148 from the HPECON 120 to the flash system 54. As such, the second feed water 122 within the HPECON 120 may be maintained at a temperature that does not cause steaming of the high-pressure feed water 142 exiting the HPECON 120 during non-integrated operation of the system 10. The bypassed excess feed water 148 may be used to generate MP and LP steam 192, 200 that may be used to provide heat to other processes within the system 10. Additionally, or in the alternative, the heat energy may be extracted from the MP and LP steam 192, 200 to drive the load 48 via the steam turbine 46. In this way, the HPECON 120 in combination with the flash system 54 may be utilized as an intermediate-pressure and low-pressure steam generator, thereby improving performance of the system 10 during non-integrated operation (e.g., without gasification of the carbonaceous fuel) and/or partial-load operation of the system 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a heat recovery steam generator (HRSG), comprising:
a first pressure economizer;
a first pressure evaporator configured to receive a first portion of a feed water from the first pressure economizer at a first pressure;
a re-heat section configured to receive the first portion of the feed water from the first pressure economizer as a first steam flow; and
a flash system comprising:
a first flash vessel configured to receive a second portion of the feed water from the first pressure economizer and to generate a first flash steam flow, wherein the system is configured to combine the first flash steam flow with the first steam flow of the feed water at a second pressure less than the first pressure.

2. The system of claim 1, comprising a control valve fluidly coupled to the first pressure economizer and to the flash system, wherein the control valve is configured to control a ratio between the first portion of the feed water and the second portion of the feed water.

3. The system of claim 2, wherein the control valve is configured to control the ratio between the first portion of the feed water and the second portion of the feed water based at least in part on a fluid level of the feed water in the first pressure evaporator.

4. The system of claim 1, wherein the re-heat section is fluidly coupled to a multi-stage steam turbine, a first stage of the multi-stage steam turbine is configured to receive the first steam flow, and a second stage of the multi-stage steam turbine is configured to receive the combined first steam flow and the first flash steam flow.

5. The system of claim 4, comprising the multi-stage steam turbine, wherein the first stage comprises a high pressure stage configured to operate at pressures greater than approximately 250 pounds per square inch (psi), and the second stage comprises an intermediate stage configured to operate at pressures between approximately 150 psi and 250 psi.

6. The system of claim 1, wherein the first flash vessel comprises a medium pressure flash vessel configured to operate at a pressure between 200 pounds per square inch (psi) and 400 psi.

7. The system of claim 1, wherein the HRSG comprises a second pressure evaporator configured to provide the feed water to the first pressure economizer at a third pressure less than the first pressure and the second pressure, and the flash system comprises a second flash vessel, wherein the second flash vessel is configured to receive a first condensate from the first flash vessel, the second flash vessel is configured to generate a second flash steam flow from the first condensate, and the second pressure vessel is configured to direct the second flash steam flow to the second pressure evaporator.

8. The system of claim 7, wherein the HRSG comprises a second pressure economizer configured to provide the feed water to the second pressure evaporator, and the second pressure economizer is configured to receive a second condensate from the second flash vessel.

9. The system of claim 7, wherein the second pressure economizer is configured to receive the second condensate and a feed flow via a deaerator.

10. A system, comprising:
a heat recovery steam generator (HRSG) comprising a high-pressure economizer and a high-pressure evaporator, wherein the high-pressure economizer is configured to provide a first fluid flow to the high-pressure evaporator, a second fluid flow to a gasifier during a first operation mode, and a third fluid flow to a flash system during a second operation mode, and
a sensor coupled to the high-pressure evaporator, wherein the sensor is configured to determine a fluid level of the high-pressure evaporator;
a controller configured to control a ratio between the first fluid flow and the third fluid flow during the second operation mode based at least in part on the determined fluid level of the high-pressure evaporator, wherein the first fluid flow is configured to drive a high-pressure stage and an intermediate-pressure stage of a steam turbine, and at least a portion of the third fluid flow is configured to combine with the first fluid flow to drive the intermediate-pressure stage of the steam turbine.

11. The system of claim 10, comprising a control valve disposed between the high-pressure economizer and the high-pressure evaporator, wherein the control valve is configured to adjust the ratio of the first fluid flow and the third fluid flow from the high-pressure economizer.

12. The system of claim 10, wherein the first operation mode is an integrated operation of a combined cycle system, and wherein the second operation mode is a non-integrated operation or a partial load operation of the combined cycle system.

13. The system of claim 10, wherein the flash system comprises a first flash vessel configured to generate the portion of the third fluid flow directed to the intermediate-pressure stage of the steam turbine.

14. The system of claim 13, wherein the flash system comprises a second flash vessel coupled to the first flash vessel, wherein the system is configured to direct steam from the second flash vessel to a low-pressure evaporator fluidly coupled to the high-pressure economizer.

15. The system of claim 14, comprising a deaerator configured to supply a feed water to a low-pressure economizer of the HRSG, and wherein the flash system is configured to direct a condensate from the second flash vessel to the deaerator to form part of the feed water supplied to the low-pressure economizer.

16. The system of claim 14, comprising a deaerator configured to supply a feed water to the HRSG, and wherein the flash system is configured to supply a condensate from the second flash vessel directly to a low-pressure economizer.

17. A method, comprising:
supplying a first-pressure section of a heat recovery steam generator (HRSG) with a feed water, wherein the first-pressure section comprises a first economizer fluidly coupled to a first evaporator, the first economizer is configured to heat the feed water to form a heated feed water, and the first economizer is configured to direct a first portion of the heated feed water to the first evaporator;
determining a fluid level of the heated feed water within the first evaporator;
directing a second portion of the heated feed water to a flash system fluidly coupled to a steam turbine, wherein the flash system comprises a first flash vessel, and a ratio between the first portion and the second portion of the heated feed water is based at least in part on the determined fluid level within the first evaporator generating a first flash steam flow in the first flash vessel from the second portion of the heated second feed water; and
directing the first flash steam flow to the steam turbine.

18. The method of claim 17, generating a second flash steam flow in a second flash vessel of the flash system from a first condensate from the first flash vessel, wherein the second flash vessel is fluidly coupled to a second pressure section of the HRSG, and the second pressure section is configured to provide the feed water to the first economizer.

19. The method of claim 18, comprising directing the second flash steam flow to a second evaporator of the second pressure section, and directing a second condensate of the second flash vessel to a second economizer of the second pressure section, wherein the second evaporator and the second economizer are disposed within the second pressure section of the HRSG, and wherein the second condensate forms at least a fraction of the feed water.

20. The method of claim 17, wherein the first flash steam flow is directed to the steam turbine via a re-heat section of the HRSG.

* * * * *